Jan. 2, 1962          F. A. SEIB          3,015,114

COMBINATION LITTER AND CARRIAGE MEANS THEREFOR

Filed Dec. 29, 1958          6 Sheets-Sheet 1

INVENTOR

FREDERICK A. SEIB

BY

ATTORNEYs

Jan. 2, 1962 F. A. SEIB 3,015,114
COMBINATION LITTER AND CARRIAGE MEANS THEREFOR
Filed Dec. 29, 1958 6 Sheets-Sheet 2

INVENTOR
FREDERICK A. SEIB
BY
ATTORNEYS

Jan. 2, 1962 F. A. SEIB 3,015,114
COMBINATION LITTER AND CARRIAGE MEANS THEREFOR
Filed Dec. 29, 1958 6 Sheets-Sheet 3

INVENTOR
FREDERICK A. SEIB
BY
ATTORNEYS

Jan. 2, 1962 F. A. SEIB 3,015,114
COMBINATION LITTER AND CARRIAGE MEANS THEREFOR
Filed Dec. 29, 1958 6 Sheets-Sheet 4

INVENTOR
FREDERICK A. SEIB
BY
ATTORNEYS

INVENTOR
FREDERICK A. SEIB
ATTORNEYS

3,015,114
COMBINATION LITTER AND CARRIAGE MEANS THEREFOR
Frederick A. Seib, 435 S. Curson Ave., Apt. 10-L, Los Angeles 36, Calif.
Filed Dec. 29, 1958, Ser. No. 783,307
7 Claims. (Cl. 5—86)

This invention relates to improvements in stretchers or litters and carriage means to manipulate and handle the same in order that the body of a patient can be placed upon it, raised and transported and lowered onto a bed or operating table, without any direct manual handling of a patient.

In my U.S. Patent 2,391,928, dated January 1, 1946, I have shown a stretcher or litter which can be utilized for lifting and transporting individuals without the necessity of the patient being directly touched or initially moved by means of an operator's hands. It is a purpose of the present invention to improve upon that litter and to associate with it an elevator carriage which can be utilized for the purpose of lifting and elevating and lowering the improved stretcher so that a patient can be lifted onto or off of a bed or onto or off of an operating table, without the necessity of any direct bodily contact of the patient with the hands of the nurse or other operator.

A further object of this invention is the provision of an improved carriage type lift elevator for transporting patients or for lifting them onto and off of an operating table or bed, having improved actuating means therefor.

Other objects and advantages of this invention will be apparent during the course of the following detailed description.

In the accompanying drawings, forming a part of this specification, and wherein similar reference characters designate corresponding parts throughout the several views.

In the drawings, wherein for the purpose of illustration, are shown preferred and modified forms of the invention, the letter A may generally designate the entire assemblage adaptable for raising, lowering and transporting a patient with respect to the stretcher portion thereof, or with respect to a bed or operating table, without any direct manual contact of the patient with the hands of the operating individual or individuals.

The assemblage A may include a litter or stretcher B and a carriage elevator or lift C.

The litter or stretcher B preferably includes a rigid frame D having movably supporting thereon body supporting members E and a shroud or sheet F adapted to cover or to enshroud the body of an individual upon the stretcher.

The carriage elevator or lift C may include a frame G which is sub-divided into a lower wheeled portion H and an upper frame portion K which may be elevated or lowered upon the frame portion H. This elevation and lowering of the portion H may be accomplished by mechanical means L or hydraulic means M.

Figure 3:
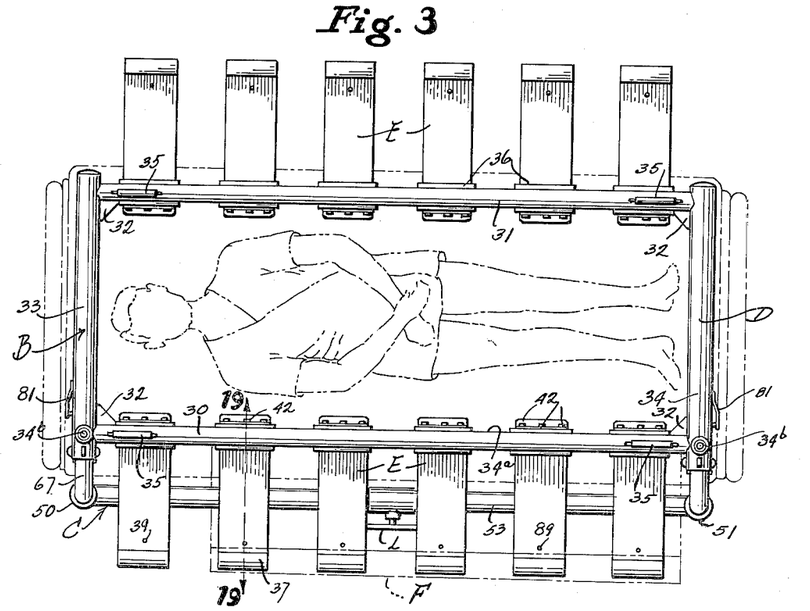
FIGURE 3 is a plan view of the assemblage shown in FIGURE 1, with the body supporting arms or members extended and in position so that the litter frame can be lowered over the body of a patient supported upon a bed (or other surface) in such relationship as to place the body of the patient within the confines of the frame in order that the body supporting arms or members can be manipulated for the purpose of extension beneath the individual's body for the purpose of ultimately placing it upon the stretcher.

Referring to the litter or stretcher B, attention is called to certain similarities of the same with respect to the litter shown in my Patent 2,391,928, dated January 1, 1946. It preferably includes elongated tubular rigid parallel side rail portions 30 and 31 which at their ends are connected (in right angled relation) with parallel end rails 33 and 34 which are preferably tubular, and which may have re-enforcing gussets 32 connecting them to the rails 30 and 31. This arrangement of rails defines an opening 34a of a size to enable the placement of the frame structure over a patient, as shown in FIGURE 3, without contact of the patient with any part of the stretcher.

Figures 12, 13, 16, 17, 18, 19, 20:
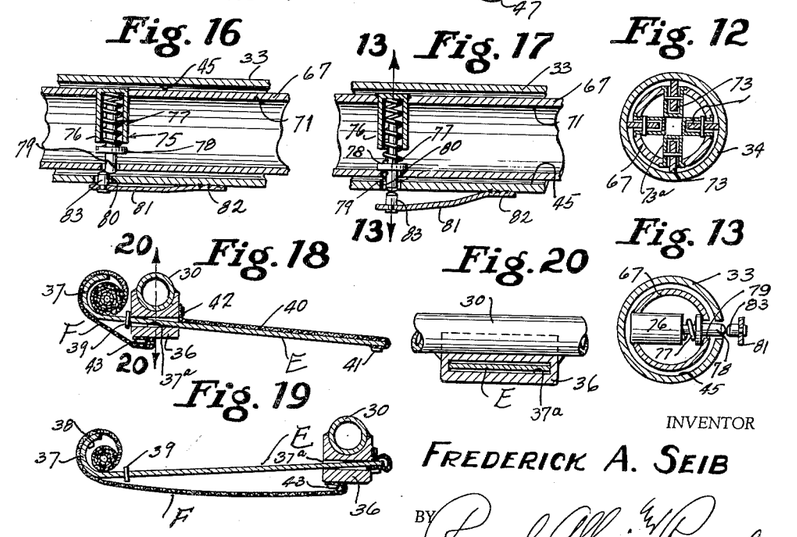
FIGURE 12 is a transverse cross sectional view taken substantially on the line 12—12 of FIGURE 14.
FIGURE 13 is a transverse cross sectional view taken substantially on the line 13—13 of FIGURE 17.
FIGURE 16 is a longitudinal cross sectional view of the telescopic end rails of the stretcher and carriage frame showing a detent mechanism in unlocked position to enable the stretcher rail to move along the carriage frame rail.
FIGURE 17 is a sectional view of the details shown in FIGURE 16, but with the detent means in locking position to hold the stretcher rail locked upon the carriage frame rail.
FIGURE 18 is a cross sectional view of a portion of the stretcher, showing one of the body supporting members thereof and the shroud means associated therewith to protect and cover the body of the patient; the body supporting members being in body supporting position upon the stretcher frame.
FIGURE 19 is a view similar to FIGURE 18, but with the body supporting member extended upon the frame of the stretcher out of body supporting position.
FIGURE 20 is a cross sectional view taken substantially on the line 20—20 of FIGURE 18.

The arms or body supporting members E, which may be appropriately called arms, are flat and elongated, and quite strong and rigid; being constructed of steel or aluminum or any alloy sufficiently strong to support a patient. The rails 30 and 31, are each provided with a series of depending supporting lugs or extensions 36, as shown in FIGURES 18, 19 and 20, having slots 37a horizontally provided therethrough, adapted to slidably receive the elongated flat supporting arms or members E. The arms are segmentally curved at their outer ends 37, to provide recesses 38 facing the rail upon which they are mounted. The depth of the slots 37a is such that the arms E can be slid and substantially horizontally supported either in extended or retracted positions as shown in FIGURES 18 and 19. The inward limited movement of the members E, with respect to the rail upon which positioned, is determined by stop pins 39 provided upon the outer ends of the members E, as shown in FIGURES 18 and 19. The upper surfaces of the arms or members E may be protected by means of elastic or stretch type fabric 40, preferably of the "Helenca" weave type. One end of the fabric is secured by a snap fastener 41 to the under-inner end of the arm E and the opposite end is secured by a snap fastener 42 upon the respective lug or extension 36 in which the arm E is supported. As shown in FIGURE 18, this ribbon or length of stretch fabric 40 furnishes protection to the body of the patient. The snap fastener 41 serves the purpose of preventing complete removal of the arm E from the frame of the stretcher by reason of contact with the extension 36, as shown in FIGURE 19.

Figure 6:
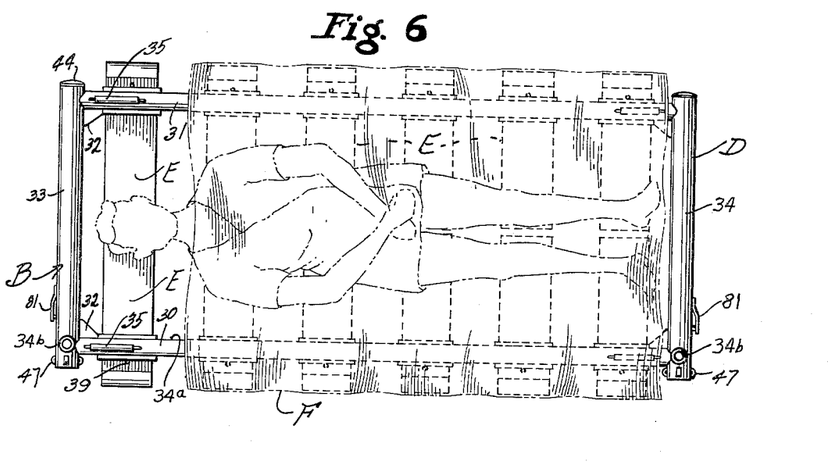
FIGURE 6 is a plan view of the stretcher, showing a patient (in dot and dash lines) in supported position thereon, and also showing a shroud or sheet and the manner in which it may encompass the body of the patient upon the stretcher, without the necessity of any direct handling of the body of the patient.

The shroud F, which may be a sheet or other piece of fabric, is connected by means of snap fasteners 43 to the undersides of the lugs or extensions 36, along the rail 30 of the stretcher frame D, as shown in FIGURE 18, and therefrom the same extends upwardly and is rolled within the recesses 38 of the curved extensions 37 upon the patient supporting arms E. The sheet F is of a length to completely cover the body of the patient, with the possible exception of the head, as shown in FIGURE 6, and it is sufficiently wide to enable complete encompassment of the patient while upon the stretcher, both above and below, as will be described hereinafter.

Figures 5, 10, 11, 14, 15:
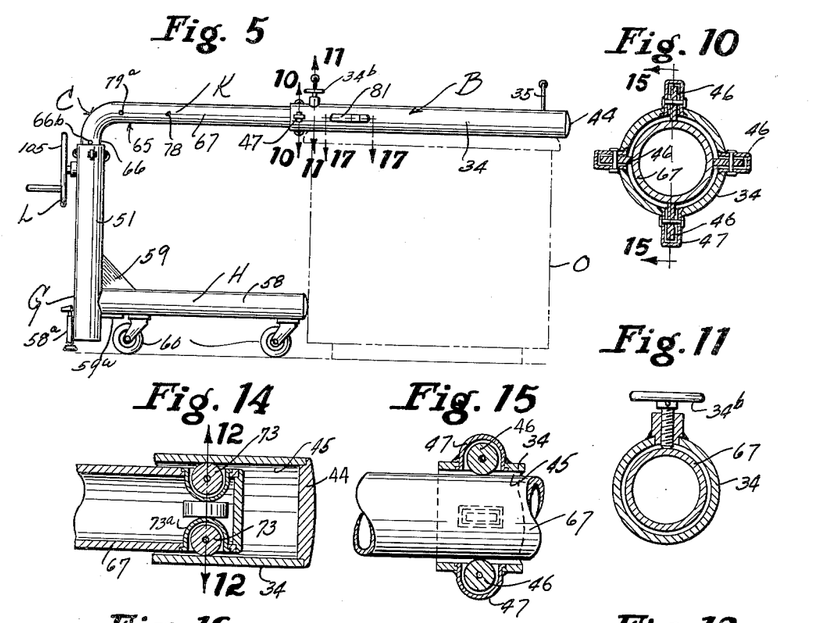
FIGURE 5 is an end elevational view of the details shown in FIGURE 4, but with the stretcher extended with respect to the carriage-lift; the dot and dash lines showing an operating table of box type which necessitates the extension of the stretcher upon the carriage so as to place or remove the patient with respect to the top of the operating table.
FIGURES 10 and 11 are transverse cross sectional views taken substantially on the respective lines 10—10 and 11—11, shown in FIGURE 5
FIGURE 14 is a fragmentary longitudinal cross sectional view showing the manner in which the carriage frame rail is provided with roller supports for the stretcher end rail in order to enable the facile telescopic movement of the stretcher and rail upon the carriage frame.
FIGURE 15 is a longitudinal cross sectional view taken through an outer end of one of the end rails of the litter showing rollers thereon for riding upon the carriage frame elevator rail.

It should be noted that the end tubular rails 33 and 34 are plugged at 44 and the passageways 45 through the rails 33 and 34 are opened at the opposite ends to permit the telescoping therein of certain rails of the elevator frame portion K of the carriage lift C. The open ended portions of the rails 33 and 34 are provided with "Teflon" or other type guide rollers 46, rotatably supported in suitable housing portions 47, with the peripheral portions projecting inwardly of the passageways 45 for contact riding along the outer surfaces of the rails of the elevatable frame portion K of the carriage C, as is shown in FIGURE 15 of the drawings. In order that the frame of the stretcher can be manually carried, each of the side rails 30 and 31 thereof, at the ends thereof, are upwardly provided with loops or handles 35.

Figure 1:
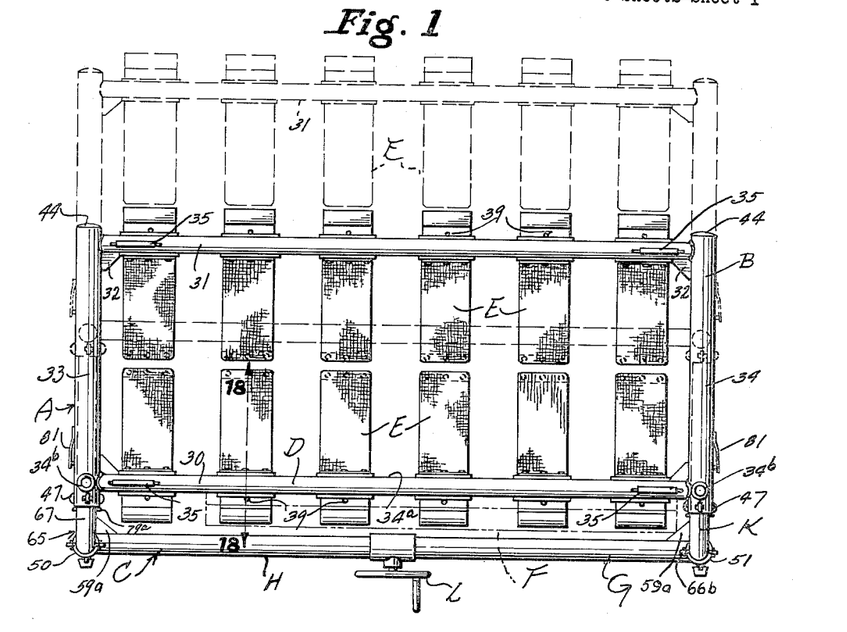
FIGURE 1 is a plan view of the improved combination stretcher and elevator carriage, showing the associated features thereof, with the stretcher having its body supporting arms in patient supporting position upon the carriage; the dotted lines showing the manner in which the stretcher can be moved with respect to the carriage.
Figure 2:
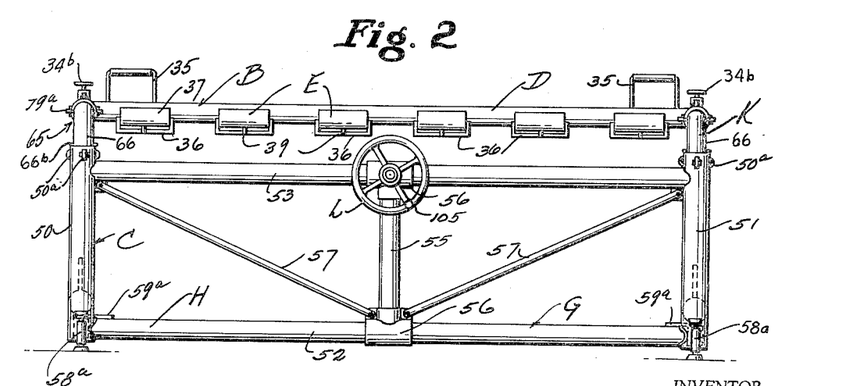
FIGURE 2 is a front elevational view of the assembly shown in FIGURE 1.

Referring to the carriage elevator or lift C, the lower frame portion H thereof preferably includes an upright rectangular shaped frame structure (see FIGURE 2) consisting of standards 50 and 51 welded or otherwise connected at their lower ends to the ends of a horizontal lower beam 52 and at their upper ends to a parallel horizontal upper beam 53. These standards and beams 50—53 are preferably of steel, magnesium, aluminum or other sufficiently sturdy material, and a central vertical connecting tube 55 is connected midway between the ends and to the beams 52 and 53 by means of sleeve structures 56. Diagonal bracing 57 may also be provided, if desired. Horizontal base arms 58 (see FIGURE 5) are welded and preferably gusset connected at 59 to the lower ends of the standards 50 and 51, and extend in cantilever fashion inwardly in right angled relation therewith; the same being provided with suitable caster wheels 60 in order to provide wheeled support for the carriage C. These arms 58 are not relatively connected together throughout their lengths from the standards 50 and 51. Lock stops 58a are provided upon the standards 50 and 51 to hold the carriage against movement upon the floor.

Figure 7:
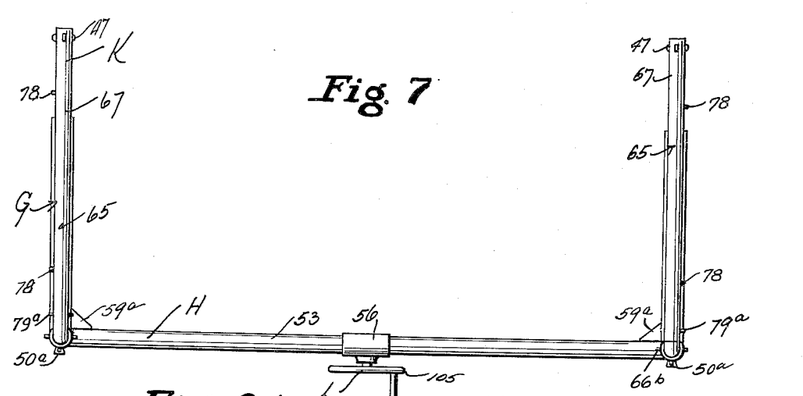
FIGURE 7 is a plan view of the carriage with the stretcher removed therefrom.
Figure 8:
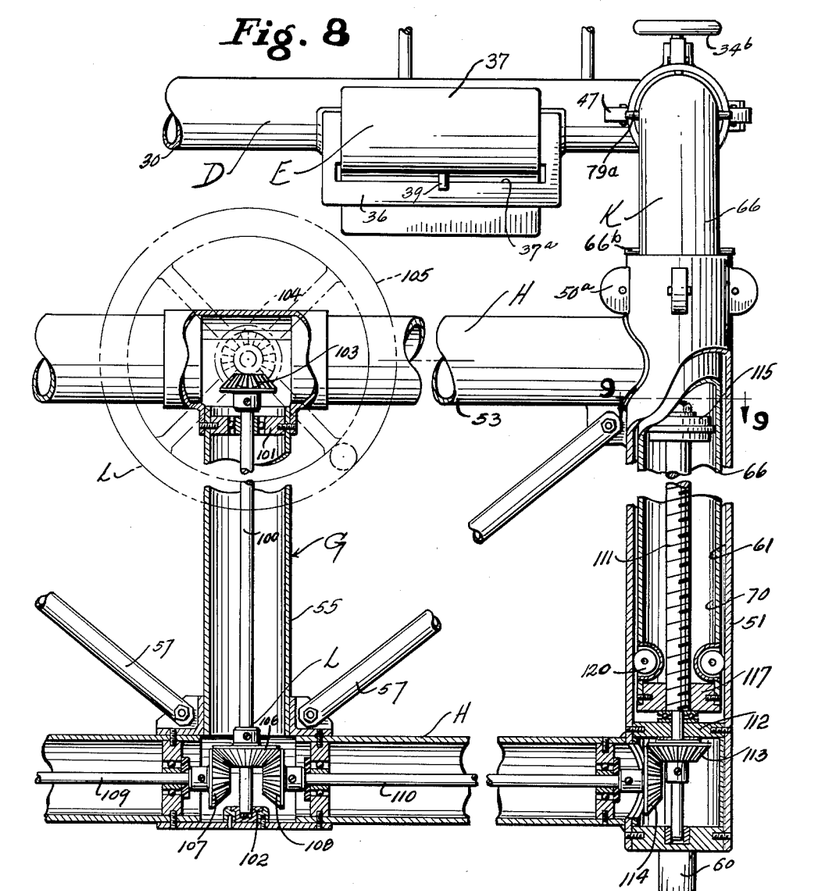
FIGURE 8 is a fragmentary view, partly in section, showing a mechanical method of raising and lowering a litter supporting frame of the carriage.
Figure 9:
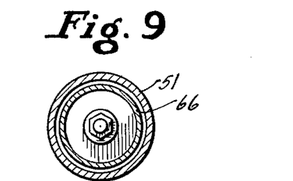
FIGURE 9 is a cross sectional view taken through one of the standards of the carriage of FIGURE 8, substantially on the line 9—9 of FIGURE 8.

The standards 50 and 51 are provided with passageways 61 therethrough, as shown in FIGURE 8, and in these passageways are slidably located upright portions of the movable part K of the frame G. This movable part K of the frame G preferably consists of a pair of L-shaped members 65, each including vertical leg portions 66 which are adapted to telescopically slide in the passageways 61 of the standards 50 and 51, and at their upper ends have horizontal supporting arms or rails 67, which are adapted to telescope in the passageways 45 of the stretcher end rails 33 and 34. The full length of these arms 67 is shown in FIGURE 7. The L-shaped members 65 are tubular; the vertical tubular portions 66 having passageways 70 therethrough and the horizontal portions 67 having passageways 71 therethrough. Limit pins 66b are secured to the standards 66 to limit lowered telescopic movement of the standards 66 into the standards 50 and 51. Limit pins 79a are secured to the inner ends to the rail portions 67 to limit the inner movements of the stretcher rails 33 and 34 upon the rails 67. The arms 67 are not relatively connected, except as to their mounting in the standards 50 and 51. Thus, the entire frame G may be moved up against a bed with the arms 67 over the bed and the arms 58 under the bed in order that the stretcher details can be manipulated, with the operator close to the bed at all times and in all positions.

In order to stabilize the riding of the portions 67 in the passageways 45 of the stretcher rails 33 and 34, the outer ends of the arm portions 67 are provided with guide rollers 73 housed at 73a and which project from the outer surfaces of the arm portions 67, as shown in FIGURES 7 and 14, in order to ride along the inner surfaces of the passageway 45 of the stretcher rails 33 and 34. Thus, the rollers 46 and 73 stabilize the support of the stretcher upon the carriage for sliding along the arm portions 67, against the possibility of binding. The upper ends of standards 50 and 51 are provided with roller enclosed housings 50ª similar to the rollers 46 which enable roller guided telescopic movement of standards 66 in standards 50 and 51.

Each arm 33 and 34 is provided with a detent assemblage 75 of a nature to lock the arms 33 and 34 upon the carriage arm 67 against sliding movement, at the extremities of movements of the portions 33 and 34 inwardly and outwardly upon the arms 67. This detent assemblage 75, best shown in FIGURES 16 and 17, preferably comprises a box structure 76 fixed upon the carriage arm 67, housing a spiral compression spring 77, normally urging a plunger 78 into extension through an opening 79, laterally in the arm 67, and into position, as shown in FIGURE 17, so that the same may move into keeper openings 80 in the arms 33 and 34. These keeper openings 80 are provided transversely through the tubular rails 33 and 34 near the outer open ends thereof. Two of these detents 75 are provided upon each of the arms 67, one near the outer end thereof and the other at the other end thereof, in the proximate position shown by the projecting detent pins 78 in FIGURE 7 of the drawings.

Figure 4:
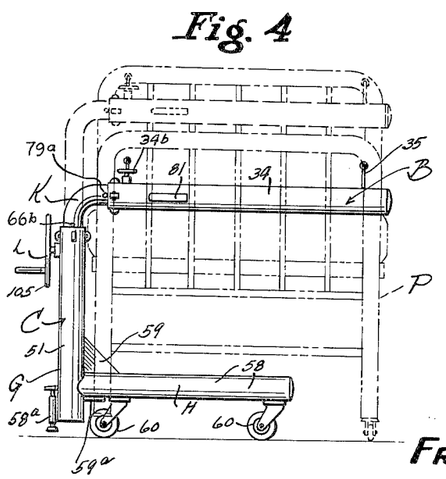
FIGURE 4 is an end view of the assemblage shown in FIGURE 1, but with a bed shown in dotted lines, illustrating the manner in which the stretcher and carriage may be associated with a bed for the purpose of elevating and/or lowering of the body of a patient with respect to the bed.

In order to release the detents 75, I provide resilient arms 81 secured at 82 to the outer surfaces of the frame tubes 33 and 34 of the stretcher, the free ends of which are provided with studs 83 in position to depress the detents 78 to the position shown in FIGURE 16, in order that the operator can then slide the rails 33 and 34 on the arms 67 inwardly or outwardly. As before stated, two of these detents 75 are provided upon the arms 67, so that there will be no possibility of accidental disconnection of the stretcher B from the frame arms 67 upon the extended position thereof, as shown in FIGURE 5, since the outermost detents 78 will then lock in the openings 80. The innermost detents 75 will also lock the stretcher B upon the arms 67 in retracted position against movement therealong as shown in FIGURE 4, until the arms 81 are manually depressed for releasing the detents as above described.

Figure 24:
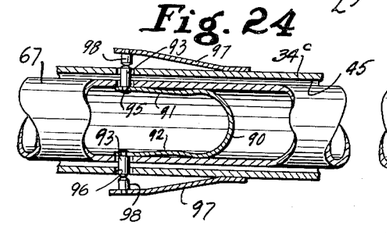
FIGURE 24 is a fragmentary cross sectional view showing a modified form of spring catch or detent for holding the litter supporting frame locked upon the frame of the carriage-lift or elevator.
Figure 25:
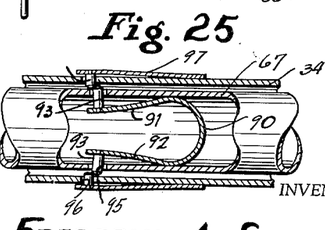
FIGURE 25 is a fragmentary cross sectional view of the details as shown in FIGURE 24, but with the detent mechanism inoperative in order that the litter frame can be slid or moved with respect to the carriage frame.

An alternate method of holding the stretcher rails upon the inner and outer ends of the rails 67, against movement with respect thereto, is shown in FIGURES 24 and 25. This alternate detent arrangement consists of providing U-shaped springs 90, which are located at the locus of the detents 75 above described, each having a pair of resilient arms 91 and 92 with detent pins 93 at the ends thereof normally urged through openings 95 provided laterally at diametrically opposed points in the arms 67, to project therefrom, and adapted for extension through locking or keeper openings 96 provided at diametrically opposed points in the stretcher arms 34ᶜ corresponding to arms 33 and 34 above described. Thus, these spring arms 91 and 92 will normally urge the pins into the positions shown in FIGURE 24, for locking the end rails of the stretcher upon the arms 67 against movement therealong. I also provide for each of the pins 93 a leaf-type release arm 97 having a stud 98 thereon which may engage against the pin 93 to enable manual push of the same out of the keeper sockets 96. The release position is shown in FIGURE 25, and in order to release both pins 93, it is merely necessary for the operator to depress the flexible pieces 97 by squeezing them between his fingers.

Referring to the mechanical means L for elevating and lowering the portion K of the carriage mechanism G, a shaft 100 is rotatably supported in a bearing 101 and step bearing 102 of the frame structure H. At its upper end, it is provided with a gear 103 which is adapted to mesh with a gear 104 provided upon the shaft of an operating wheel 105. The lower end of the shaft 100 has keyed thereto a bevelled gear 106 which meshes with gears 107 and 108, keyed upon shafts 109 and 110 respectively bearing in tube 52. In each of the standards 50 and 51 of the carriage portion H, there is provided a feed screw 111 (see FIGURE 8) rotatably supported in a bearing 112 mounted in the lower end of the respective standard 50 or 51, which at the lower end thereof is provided with a keyed bevelled gear 113 meshing with a bevelled gear 114 on the end of each of the shafts 109 and 110, opposite the gears 107 and 108. With this arrangement, it is obvious that upon rotation of the wheel 105, the shafts 109 and 110 will rotate the feed screws 111 disposed axially within the standards 50 and 51. The feed screws 111, at their upper ends, are each provided with nut motion limiting means 115.

The tubes 66, which slide or are telescoped in the standards 50 and 51, at their lower ends, are each provided with a nut 117 threaded to receive the feed screw 111. It is apparent that upon rotation of the feed screws the nuts 117 will feed the standards or tubes 66 vertically. In addition to the rollers provided at the upper ends of the standards 50 and 51 for stabilizing movements of the tubes 66, the latter at their lower ends may be provided with "Teflon" rollers 120 which engage the inside surfacing of the standards 50 and 51.

Figure 21:
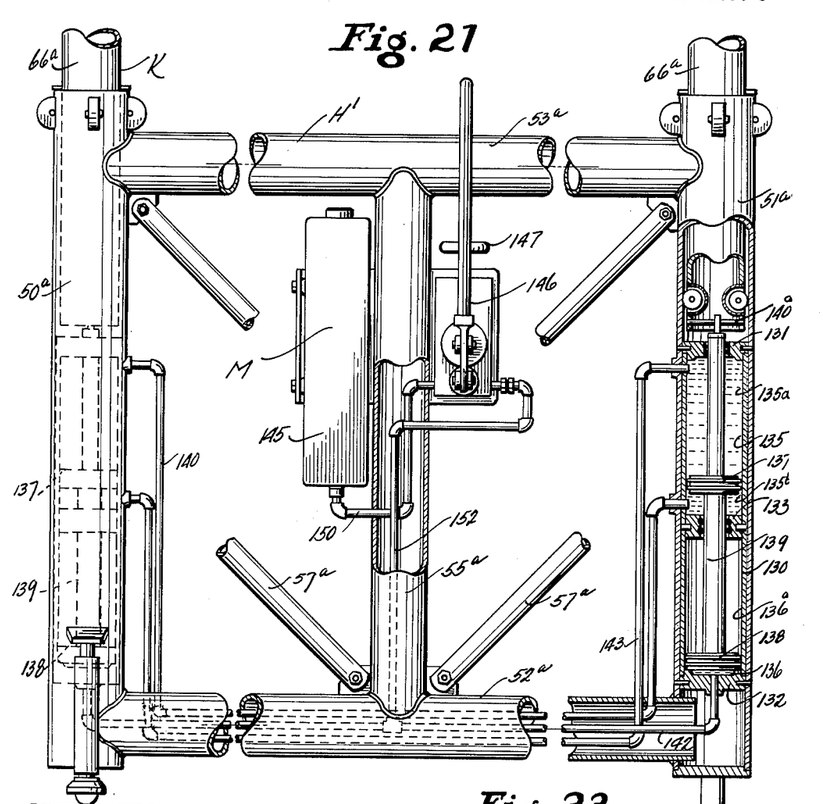
FIGURE 21 is a fragmentary modified form of means (hydraulic) partly in section for raising and lowering a portion of the framework of the carriage-lift upon which the litter is adapted to be supported.
Figure 22:
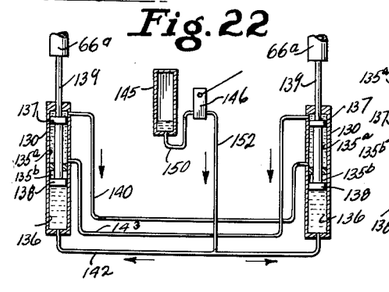
FIGURE 22 is a diagrammatic view of the hydraulic system of the mechanism of FIGURE 21, showing the piston arrangements of the hydraulic cylinders in an up position as for supporting the stretcher in elevated position.
Figure 23:
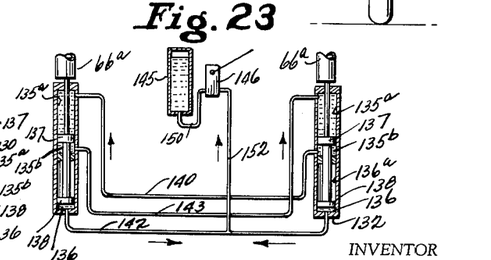
FIGURE 23 is a diagrammatic view similar to FIGURE 22, but with the piston and cylinder arrangements in the position they will assume when the litter or stretcher supporting portion of the carriage frame is in a down position as for supporting the litter in a lowermost position.

Referring to the hydraulic system shown at M in FIGURES 21, 22 and 23, the frame H' of the carriage may here consist of lower and upper horizontal rail tubes 52ª and 53ª which at their ends are connected to vertical standards 50ª and 51ª, as shown in FIGURE 21. A central tube 55ª connects the midway portions of the upper and lower rails or tubes 52ª and 53ª and diagonal bracing 57ª may be used if desired. The standards 50ª and 51ª are hollow and house cylinders of the hydraulic mechanism M. Each standard 50ª and 51ª houses a cylinder casing structure 130 provided with a top wall 131; a bottom wall 132, and an intermediate wall 133 subdividing the cylinder into upper and lower piston chambers 135 and 136 wherein are slidably disposed pistons 137 and 138 respectively. These pistons are keyed upon a common piston rod 139 connected at 140ª to the lower end of the movable carriage tube 66ª which corresponds to tube 66 above described. A hydraulic fluid reservoir 145 is positioned upon the upright or brace tube 55ª as is also a hydraulic hand pump 146 which may have a control valve mechanism 147, thereon of conventional construction.

The pump 146 receives a supply of fluid from the reservoir 145 via a pipe 150. From the pump 146 the fluid is transferred to a pipe line 152 leading into the bottoms of the cylinder walls 132 and into the chambers 136 below the pistons 138. The upper cylinder chamber 135 is divided by the piston 137 into an upper chamber 135ª and a lower chamber 135ᵇ. A pump line 140 connects the upper chamber 135ª of the hydraulic chamber 130 in the standard 50ª with the lower chamber 135ᵇ in the cylinder 130 of the standard 51ª, as shown in FIGURES 22 and 23. A pipe line 143 connects the upper cylinder chamber 135ª of the standard 51ª with the lower chamber 135ᵇ of the cylinder which is within the standard 50ª. Chambers 135ª and 135ᵇ are completely filled with hydraulic fluid. The pipe lines 140 and 143 will also be filled with fluid. The bottoms of chambers 136 are connected by pipe line 142. When the pump 146 is actuated, to raise the portions K, hydraulic fluid will be pumped into the bottoms of the chambers 136, exerting a force against the lower pistons 138 causing them to rise. The system equalizes and raises the upper pistons 137 simultaneously and to the same degree the hydraulic fluid in the upper cylinder portion 135ª of the cylinder in the standard 50ª will be displaced and transferred to the lower chamber portion 135ᵇ of the cylinder in the standard 51ª. A reverse flow action of the hydraulic fluid in the upper and lower chamber portions 135ª and 135ᵇ of the cylinders 130 of tubes 50ª and 51ª takes place through line 143. The forces will be equalized for positive movement of unequally loaded cylinders. For lowering the carriage parts K, the fluid flows reversely between the cylinders, as shown in FIGURE 23. Any suitable ports (not shown) may be provided in the cylinder to vent air from the air spaces 136ª above the pistons 138.

Referring to the manipulation of the structure of the carriage with respect to a patient, a bed and an operating table, if it is desired to transfer a patient from a bed shown at P in FIGURE 4 of the drawings to an operating table shown at O in FIGURE 5 of the drawings, the carriage C with stretcher B attached is rolled along the side of the bed P. Standing at the center of the lift, the operator turns the hand wheel 105 clockwise to raise the movable portions K of the carriage C to maximum height, in order that the bottom of the stretcher portion of the lift will be above the highest point of the patient. With the stretcher in this position, the operator rolls the lift laterally over the patient and bed, between the head and foot of the bed. With the carriage in this position, the operator sets the lock stops 58a to fasten the unit in place against floor movement. The shroud F is rolled into the position shown in the drawings, and at this time the operator drops the rolled sheet on the edge of the mattress and along the full length of the patient. The operator next proceeds to withdraw the arms E on both sides of the stretcher, until the frame opening 34a is completely exposed. The operator observes if the center line of the stretcher frame is symmetrical with respect to the longitudinal axis of the patient's body. If not, the screws 34b are adjusted and the stretcher can be moved along the carriage arms 67. After the stretcher frame has been centered over the body of the patient, the locking screws 34b are set to lock the stretcher frame upon the arms 67 against movement therealong. The operator then lowers the stretcher frame, through manipulation of the control means L or M, as the case may be, until the end and side rails of the stretcher frame surround the patient and press into the bed mattress. The nurse or operator then loosens the sheets and blankets over the patient and moves them to the far side of the patient's body. The operator then inserts each of the supporting arms E beneath the patient's body and over the bed. Usually, in doing this, the operator places the back of a hand, palm facing down, gently under and against the patient's body and with the other hand gently pushes each arm E laterally though its support upon the rails 30 or 31 and guides the supporting arms into position beneath the patient's body. The coverings 40 upon the supporting arms E protect the patient from skin contact with the metal of the arms E and thus cold shock is avoided. It will be noted that the supporting arms E are rather loosely mounted in the slots 36 to enable easy sliding and application of the same beneath the patient's body. They deflect under the patient's weight such that when the patient is supported by the arms E it is impossible to slide them or withdraw them laterally from under the patient's body without forceful pushing. Next, the actual raising of the stretcher takes place, by the means L or M, and when the stretcher frame has been raised sufficient to lift the patient from the bed mattress the operator gathers the rolled shroud F and draws it under the bottom of the stretcher frame and brings it up and returns it over the opposite side of the stretcher frame upon the top of the patient's body to totally enclose the patient and the stretcher frame within the shroud to protect the patient from drafts, etc. The patient now being in a raised position and clear of the bed or any part of it, is now ready to be wheeled to the operating room. The operator releases the stop locks 58a and pulls the carriage C laterally away from the bed.

In the case of transferring the patient merely from one bed to another, the operator will simply reverse the above procedure. The same procedure will be followed when lowering the patient upon that type of operating table having a center foot or pedestal support which will not limit the movement of the carriage base beneath the operating table. In the case of a cabinet type operating table O, such as shown in FIGURE 5, it is necessary to move the carriage C until the free ends of the frame rails 58 engage the side of the table O, as shown in FIGURE 5. The operator then steps on the stop locks 58a to lock the carriage in place against movement. The stretcher frame is then lowered toward the operating table. At this time, only a portion of the stretcher frame will be positioned over the operating table. As soon as the stretcher frame is almost touching the surface of the operating table two nurses, interns, or operators, one at each end of the stretcher frame, grasp the handles 35. One of the operators releases the clamping screws 34b. The operators grasping the handles 35 slide the end rails 33 and 34 of the stretcher frame outwardly along the arms 67 of the elevated part K of the carriage until the entire stretcher frame is centrally located over the operating table. Any tilting of the stretcher is prevented because the operating table will support the stretcher frame when the operators at the ends of the stretcher release the handles 35. Of course the detent structures shown in FIGURES 16, 17, 24 and 25 must be operated in order to permit sliding movements of the stretcher transversely upon the carriage arm 67. It is possible through manipulation of these detents to entirely separate the stretcher from the carriage C in a manner which will be apparent from the foregoing description. After the stretcher has been placed on the operating table, the supporting arms E may be withdrawn from beneath the body of the patient and then the entire stretcher frame can be lifted free from the patient and operating table.

Gussets 59a are preferably welded to the bottoms of base arms 58 and the tops of the lower beam 52.

Various changes in the size, shape and arrangement of parts may be made to the form of invention herein shown and described, without departing from the spirit of the invention or scope of the claims.

I claim:

1. In a stretcher construction, the combination of a frame having a patient receiving opening therein and including side rails and end rails, rigid patient supporting arms movably supported by the side rails for transverse sliding thereon into and out of the opening in said frame whereby the frame with the arms extended may be lowered completely over the body of the patient to place the body of the patient within the opening of the frame and the arms then extended beneath the patient for supporting the body of the patient, said arms being provided with pocketed ends at the outer side of at least one of said rails, the pockets opening inwardly towards said rail, and a rolled shroud supported lengthwise in unrollable relation in said pockets for lateral extension over a patient lying in the patient receiving opening of the frame.

2. In a carriage construction for portably supporting a stretcher, the combination of a lower wheeled frame comprising vertical tubular standards having a wheel base connected thereto and having horizontal upper and lower rails connected at their ends to the vertical tubular standards, an upper frame mounted upon the lower frame for elevation and lowering comprising a pair of L-shaped rigid members, each including a vertical leg which is telescopically disposed in the passageway of its respective standard and projects above the top of its respective standard and which additionally has a horizontally extended stretcher supporting arm located in a position appreciably above the upper rail of the frame, means mounted upon said lower wheel frame for elevating and lowering said L-shaped members with respect to the standards, and a body supporting stretcher comprising side rails and end rails defining an opening adapted to receive the body of a patient, a plurality of rigid extensible and retractable body supporting members movably carried by each of the side rails for transverse movement into and out of the opening defined by said rails, the mounting of said body supporting members being such that they may be moved laterally into and out of the frame opening without appreciable tilting and being located in a position whereby when extended from the side rail closest to the upper tubular rail of the lower wheeled frame they will upwardly clear the said upper tubular rail of the lower frame even when the upper frame is at its lowermost position upon the lower frame.

3. The carriage construction defined in claim 2 in which anti-friction means is provided upon the end rails of the stretcher frame and the horizontal arms of the L-shaped members, and detent means on said stretcher end rails to lock said end rails in extended or retracted relation upon the horizontal arms of the L-shaped members.

4. In a stretcher construction, the combination of a frame having a patient receiving opening therein and comprising side rails and end rails, rigid patient supporting members movably carried by the side rails for transverse sliding thereon into and out of said opening whereby the frame with said members out of the opening may be lowered completely over the body of the patient to place the body of the patient within the opening of the frame and the arms then extended into the opening beneath the patient for supporting the body of the patient, a shroud marginally detachably connected to one of the side rails, the rigid supporting members of said last mentioned rail having means at the outer ends thereof for supporting the shroud in rolled connection thereon, said shroud being of such length that the same may be extended over the rigid supporting members when projected into the opening and extended across the other side rail and around the latter side rail and then beneath the stretcher to the locus of attachment of the said shroud to the other side rail.

5. In a stretcher construction, the combination of a frame having a patient receiving opening therein and including side rails and end rails, rigid patient supporting members movably supported by each of the side rails for transverse sliding thereon into and out of the opening in said frame whereby the frame with the members extended upon the side rails may be lowered completely over the body of the patient to place the patient within the opening of the frame and the members then projected beneath the patient for supporting the body of the patient when the stretcher is lifted, said rigid supporting members each being provided with flexible stretch type cover pieces connected at the innermost ends of each of the patient supporting members and extended over the tops of the members and connected at their other ends to the side rails upon which the patient supporting members are respectively connected.

6. The stretcher construction defined in claim 5 in which a shroud is detachably connected to one of the side rails and of a width to extend over to the other side rail.

7. A combination stretcher and carriage assembly comprising a carriage including a lower frame portion which includes horizontal base arms and upright tubular standards rigidly connected with said arms, supporting wheel means upon said horizontal arms, lock stop means upon said lower frame portion for engaging a floor to hold the carriage against movement, the tubular standards having passageways therethrough opened at the tops thereof, an upper frame for the carriage comprising a pair of relatively nonconnected L-shaped members one for each of said standards and each of which includes a vertical leg portion telescopically received in the passageway of its respective standard of the lower frame, said L-shaped members each including a horizontal supporting arm laterally extending in cantilever fashion from its standard, means upon the lower frame of the carriage for elevating and lowering the L-shaped members of the upper frame whereby to raise and lower the horizontal supporting arms of said upper frame in unison, a stretcher including a rectangular frame including relatively spaced tubular side rails and end rails provided with passageways therethrough to telescopically receive the supporting arms of the upper frame of the carriage whereby to horizontally adjust the position of the stretcher frame along the arms of said upper frame, guide roller means mounted upon said standards for stabilizing the elevated and lowered movements of the upper carriage frame vertical legs, anti-friction roller means provided upon the upper carriage frame arms and the tubular end rails of the stretcher frame for stabilizing the telescopic movements of the frame along said upper carriage frame arms, and body supporting means comprising a plurality of rigid extensible and retractable body supporting members movably carried by each of the side rails of the stretcher for transverse movement with respect thereto into and out of the space defined by said frame rails, the slidable mounting of said body supporting members being of such that they may move laterally into and out of the frame space without appreciable tilting whereby to prevent sagging of the same when supporting a body in order that the stretcher can be moved upon said L-shaped arms with facility over a bed or table.

References Cited in the file of this patent

UNITED STATES PATENTS

| | | |
|---|---|---|
| 713,794 | Ostermann | Nov. 18, 1902 |
| 733,803 | Black | July 14, 1903 |
| 787,848 | Lung | Apr. 18, 1905 |
| 1,173,459 | Palmer | Feb. 29, 1916 |
| 2,375,907 | Farmer | May 15, 1945 |
| 2,391,928 | Seib | Jan. 1, 1946 |
| 2,418,606 | Smith | Apr. 8, 1947 |
| 2,498,853 | Hassold et al. | Feb. 28, 1950 |
| 2,544,593 | Feist | Mar. 6, 1951 |
| 2,565,761 | Dean | Aug. 28, 1951 |
| 2,613,372 | Waterman | Oct. 14, 1952 |